(No Model.)

W. C. WOODS.
NUT LOCK.

No. 498,601. Patented May 30, 1893.

Witnesses:
Wm C Cashiell
Arthur S Bryant

Wm. C. Woods.
Inventor:
By Edson Bros,
Att'ys.

UNITED STATES PATENT OFFICE.

WILLIAM C. WOODS, OF FAY, PENNSYLVANIA.

NUT-LOCK.

SPECIFICATION forming part of Letters Patent No. 498,601, dated May 30, 1893.

Application filed February 25, 1893. Serial No. 463,713. (No model.)

*To all whom it may concern:*

Be it known that I, WILLIAM C. WOODS, a citizen of the United States, residing at Fay, in the county of Lawrence and State of Pennsylvania, have invented certain new and useful Improvements in Nut-Locks; and I do hereby declare the following to be a full, clear, and exact description of the invention, such as will enable others skilled in the art to which it appertains to make and use the same.

My invention relates to improvements in devices for holding a nut firmly and securely in position on a bolt; and the object of the invention is to provide a simple and strong device which will not interfere with the nut being tightened or screwed farther on its bolt; but effectually prevent its becoming loose and slipping from the bolt.

With these ends in view my invention consists in the combination with a nut having a series of retaining teeth formed on one face around one end of the central threaded passage in the nut of a washer, composed of spring metal and provided with an aperture or opening, adapted to align with the passage in the nut and receive the bolt, and an integral laterally projecting tongue adapted to engage with the retaining teeth on the nut and prevent the same from turning in one direction on the bolt.

My invention further consists in the peculiar construction and arrangement of parts as will be hereinafter more fully pointed out and claimed.

Figure 1:
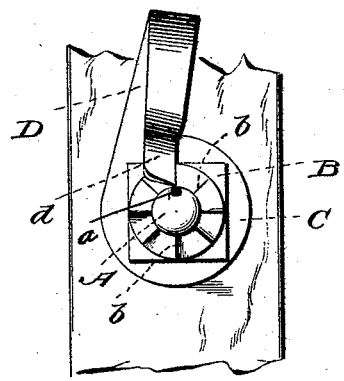
Figure 2:
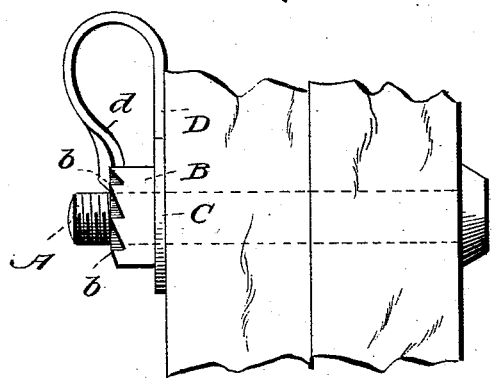
Figure 3:
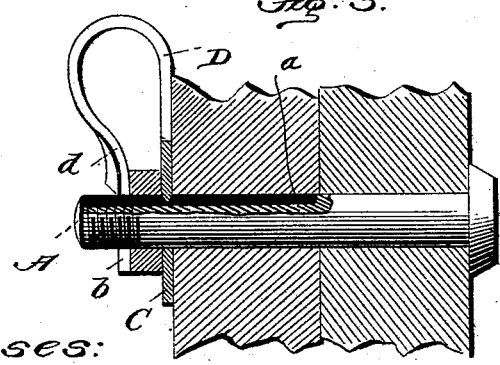

In the accompanying drawings—Figure 1 is an elevation of a bolt provided with my improvements. Fig. 2 is a side view of the same, and Fig. 3 is a longitudinal sectional view.

Like letters of reference denote corresponding parts in the several figures of the drawings, referring to which—

A designates a bolt which may be of any desired size and pattern; and B designates a nut which is provided with the ordinary interiorly threaded central passage or opening designed to receive the exterior threads on the bolt.

A washer or plate C, is constructed of any suitable spring metal and provided with an opening to receive the body of the bolt between the nut B thereon and the object through which the bolt extends; and said plate or washer is provided with an integral laterally projecting tongue D. The bolt A is provided with a longitudinally extending groove, $a$, and the washer or plate C is provided with a projecting teat which extends into said groove, $a$, and said washer is thus prevented from turning on the bolt. The tongue D, may be of any desired length and is preferably reduced in width or tapered from its inner to its outer end. Said tongue is bent upon itself to provide a portion, $d$, which extends parallel to the main body of the tongue and is separated therefrom by a space equal to the thickness of the nut B. As shown in the drawings, the tongue is first bent so as to extend slightly beyond or above the outer face of the nut B and then bent toward said nut, the outer end of the tongue being adapted to engage with a series of ratchet or retaining teeth, $b$, formed on the outer face of the nut, B, and arranged concentric with the interiorly threaded passage or opening in the nut. The ratchet teeth are, as shown in the drawings, provided with an inclined upper face or surface and a level face from the thickest end of one tooth to the reduced end of the next succeeding tooth. The free end of the tongue D is so bent as to rest on the inclined surface of the teeth, as they are successively brought in line therewith by rotating the nut, and bear against the rear level side of the forward tooth. The tongue D does not interfere at all with moving the nut forward or on the bolt, as the inclined surfaces of the teeth on the nut will slide freely thereunder; but said tongue bears closely against the level side of one of the teeth and effectually prevents the nut from being turned so as to remove the same from the bolt.

It will thus be seen that I have provided a simple, strong and durable fastener which while not interfering with the forward movement of the nut will effectually prevent the same from becoming loose or slipping from the bolt.

Having thus described my invention, what I claim as new, and desire to secure by Letters Patent, is—

1. The combination with a bolt, of a nut adapted to be screwed on the bolt and provided on its upper or outer face with a series of ratchet teeth, and a washer adapted to be rigidly secured on the bolt and having an integral projecting tongue adapted to engage with the teeth on the nut, substantially as described.

2. The combination with a bolt, of a nut provided with the usual bolt receiving passage and having a series of ratchet teeth formed on its upper or outer face and arranged concentric with the passage, and a washer adapted to be secured on the bolt so as not to turn thereon and having a laterally projecting tapering tongue which is bent upon itself so that its free end is adapted to engage with the teeth on the nut, substantially as described.

In testimony whereof I affix my signature in presence of two witnesses.

WILLIAM C. WOODS.

Witnesses:
CHAS. E. MEHARD,
J. NORMAN MARTIN.